United States Patent [19]

Duckett et al.

[11] 3,887,750

[45] June 3, 1976

[54] COMPRESSIBLE PRINTING BLANKET

[75] Inventors: John C. Duckett, Clyde; Wayne W. Easley; William T. Wickham, both of Waynesville, all of N.C.

[73] Assignee: Dayco Corporation, Dayton, Ohio

[22] Filed: Jan. 8, 1973

[21] Appl. No.: 321,901

[52] U.S. Cl. ............... 428/297; 428/245; 428/251; 428/317; 428/320; 428/398; 428/903; 428/909; 264/41; 264/46.5; 264/257; 264/DIG. 6
[51] Int. Cl.² ........................................ B41N 9/00
[58] Field of Search ........ 161/401, 400, DIG. 5, 88, 161/93, 151, 160, 165, 178; 264/DIG. 6, DIG. 17, 177 F, 257, 182, 209, 465, 41; 260/2.5 B, 2.5 H, 890, 891

[56] References Cited
UNITED STATES PATENTS

| 2,047,624 | 7/1936 | Freedlander | 161/401 |
| 2,792,322 | 5/1957 | Fredericks | 161/401 |
| 3,121,698 | 2/1964 | Orsino et al. | 260/2.5 H |
| 3,276,947 | 10/1966 | Waterman | 161/144 |
| 3,700,541 | 10/1972 | Shrimpton | 161/DIG. 5 |

Primary Examiner—George F. Lesmes
Assistant Examiner—James J. Bell
Attorney, Agent, or Firm—Reuben Wolk

[57] ABSTRACT

A compressible printing blanket and method of manufacture, in which the blanket has at least one base fabric layer, an elastomeric face, and an intermediate compressible layer. The compressible layer is formed of an elastomeric matrix into which hollow fibers have been incorporated. These fibers create unconnected voids which form a cellular layer.

7 Claims, 2 Drawing Figures

COMPRESSIBLE PRINTING BLANKET

BACKGROUND OF THE INVENTION

This invention relates to compressible printing blankets and method of manufacturing such blankets. The type of blanket referred to herein is laminated and is used primarily in offset lithographic printing, but may also find utility in other fields of printing.

The use of blankets in offset lithography has the primary function of transferring the ink from the printing plate to the paper. Printing blankets are very carefully designed so that the surface of the blanket is not damaged either by the mechanical contact with the parts of the press or by chemical reaction with the ink ingredients. The repeated contacts cause a certain amount of compression of the blanket which must be within proper limits so that the image is properly reproduced without causing permanent deformation of the blanket. The blanket must be capable of eventually returning to its original thickness, and provide constant transfer of the image throughout its life.

In addition to the inherent variations of the printing apparatus, conventional blankets may also have minute variations in thickness which are formed during the manufacturing steps. The existing high or low spots in such a blanket may, therefore, create uneven reproductions on the finished product.

Printing blankets utilize a base material to give the blanket integrity, and woven fabrics are preferred for this purpose. The base may consist of one, two, three, or more layers of fabric. The working surface, by which is meant the surface that actually contacts the ink, is usually an elastomeric layer made of natural or synthetic rubber which is applied over the base layer. This is usually done by calendering or spreading rubber in successively thin layers until a desired thickness of rubber has been deposited, after which the assembly is cured to provide the finished blanket. Such a blanket is perfectly acceptable for many kinds of printing, but often lacks the necessary compressibility for other operations. It is desirable, however, to have more highly compressible blankets available.

It is difficult to obtain this improved compressibility by the standard construction described above because the rubber material, while it is highly elastomeric, cannot be compressed in a direction at right angles to its surface without causing a distortion or stretch of the blanket. If irregularities exist in the printing plate, the presses, or the paper, then the compression to which the blanket is exposed will vary during the operation. Other approaches to compressible blanket design must be made.

Blanket manufacturers have introduced products in the past in an effort to create additional compressibility, such as by the use of sponge rubber, textile fibers, special fabric layers, felt, or microspheres. Some of these are described in U.S. Pat. Nos. 2,792,322; 3,147,698; 3,285,799; 3,652,376; and 3,700,541.

SUMMARY OF THE INVENTION

The present invention provides an offset blanket having a compressibility which meets all the needs of the industry. This is accomplished by providing an intermediate layer between the base fabric consisting of one or more plies, and the working surface, this intermediate layer being formed of an elastomeric matrix in which are dispersed a large number of discrete, small diameter, hollow fibers. These fibers are approximately 0.01 to 0.1 millimeter in diameter and are incorporated directly into the matrix which is then spread onto the single or multiple ply base fabric. Another fabric ply is placed over this intermediate layer, and then an outer layer or working surface is spread onto the fabric ply. The entire assembly is cured and the fibers become completely and uniformly embedded in the matrix in such a way that unconnected voids are formed uniformly throughout the matrix to form a closed cellular structure. The fibers, and hence the voids, remain unconnected and do not agglomerate into larger voids.

The resultant blanket is thus sufficiently compressible to avoid all the irregularities in operation described above, is consistent and substantially uniform throughout, and may be controlled to achieve any desired compressibility. The term "compressibility," as used in the printing art, refers to the ability of the blanket to compress and return readily, without distortion in lateral directions. The structural integrity and cohesive strength of such an intermediate layer is very high and the voids are never ruptured and thus remain intact throughout the layers regardless of the compression and expansion of the blanket. Because of the fact that these voids are fully enclosed they provide sufficient resilience in the matrix so that a rapid compression and expansion takes place even during the high speed operation of the presses in which they are used.

DESCRIPTION OF THE PREFERRED EMBODIMENT

Figure 1:
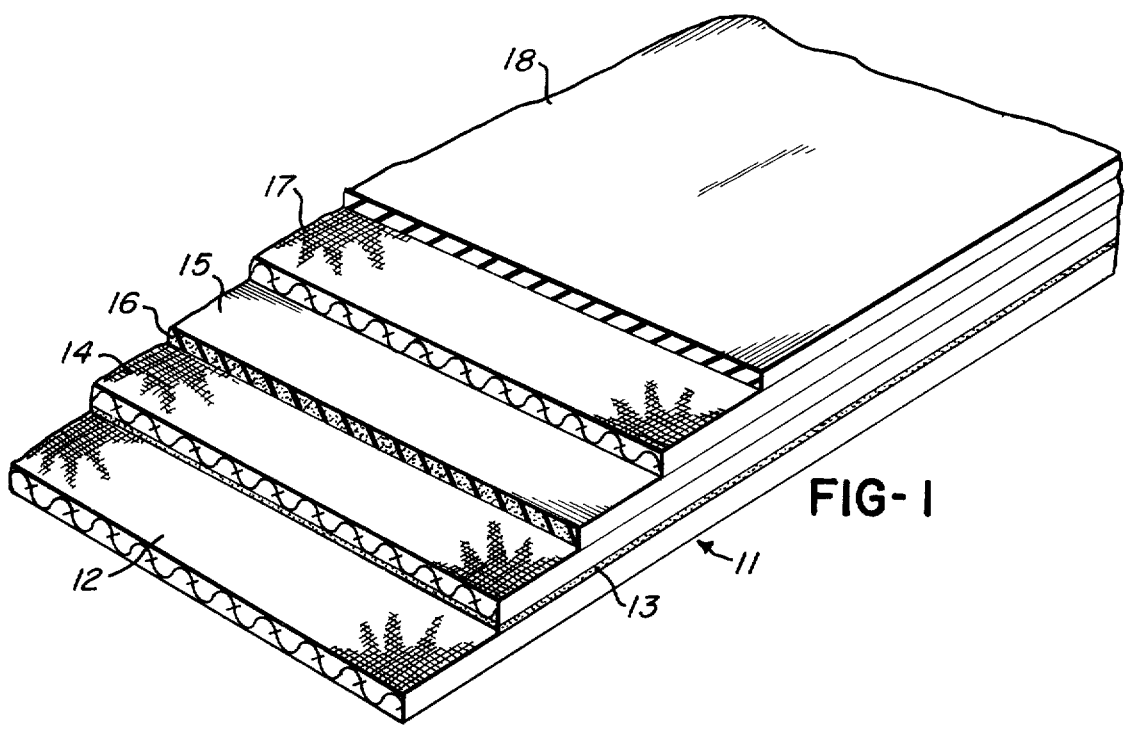
FIG. 1 is an isometric view of a segment of the novel blanket with parts broken away to illustrate the invention.
Figure 2:
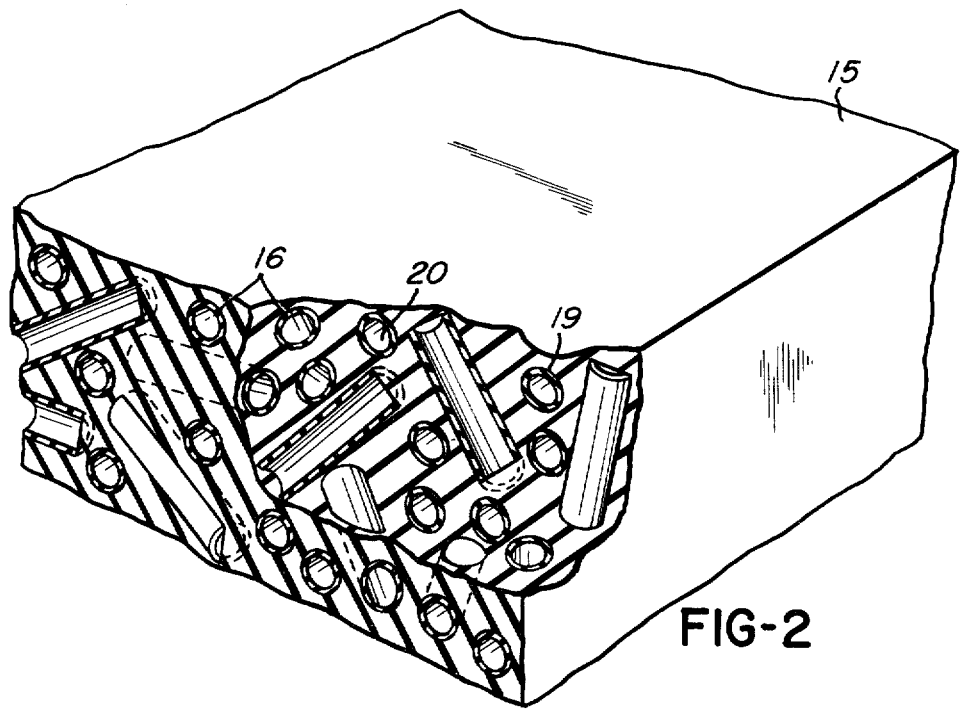
FIG. 2 is a greatly enlarged cross section of the compressible layer, illustrating further principles of the invention.

The printing blanket 11 which is illustrated in FIG. 1 consists of the base fabric which in this case is formed of two plies of woven fabric 12 and 14. It is, of course, conventional to utilize one, two, three, or even more layers as the base fabric, depending on the type of product which is desired. The specific type of fabric to be utilized will not be described in great detail since this is conventional in the manufacture of printing blankets, but the plies are usually low stretch fabrics such as certain types of cotton, rayon, or glass. In the normal manufacturing process, each ply is formed by a single band of fabric. The plies 12 and 14 are bonded together by an adhesive layer 13, such as neoprene cement or other suitable material.

The compressible intermediate layer 15 is formed by conventional rubber processing methods and consists essentially of a synthetic elastomeric material such as butadiene-acrylonitrile rubber and standard curatives and pigments. The compressibility is achieved by mixing into this material 5 to 25 parts by weight of hollow fibers (designated by reference numeral 16) for each 100 parts of the elastomeric material; included in the mixture are also about 100 parts of aromatic solvent and small quantities of the aforementioned curatives and pigments. The materials are thoroughly mixed and spread onto the fabric layer and heated to evaporate most of the solvent. The thickness of this intermediate layer is approximately 0.012 inch to 0.016 inch. Another ply of fabric 17, similar to plies 12 and 14, is placed over the layer 15. The last step in the construction is to apply the surface layer 18 of rubber by conventional spreading processes until the desired surface layer thickness is achieved (approximately 0.010 inch thick). The conventional curing processes are then applied to laminate the various plies and layers into the final product. The blanket will have an over-all thickness of approximately 0.065 inch. If desired, additional layers of adhesive, similar to layer 13, are placed between layer 15 and fabric plies 14 and 17.

The fibers 16 are discrete, hollow segments formed by chopping continuous hollow fibers, or by discontinuously forming these segments. The fibers range from about 0.001 to 0.01 millimeter in diameter, averaging about 0.03 millimeter. The fibers are preferably formed of a material such as a vinylidene chloride-acrylonitrile copolymer, or similar material which is compatible with the material forming the matrix. The mixing process disperses the fibers uniformly and thoroughly throughout the elastomeric matrix, and after the curing takes place the walls 19 of the fibers tend to bond themselves against the adjacent material, leaving voids 20 which are completely enveloped in material so that the matrix thus has a closed-cell cellular structure. The elastic nature of these walls permits the voids to become compressed, thus improving the compressibility of the layer. Actually, it is not necessary that these walls remain intact; even if they should rupture or melt during curing, the voids remain intact and separate from each other. The completed blanket when subjected to 125 p.s.i. pressure at right angles to the face will permit a compression deflection of approximately 0.004 inch to 0.011 inch, which has been determined to be ideal for conditions of use. The following examples are typical of the types of printing blankets which may be manufactured in accordance with this invention:

EXAMPLE I

Two fabric plies of 0.015 inch each were formed of cotton duck fabric which has been prestretched to give dimensional stability. These plies were bonded together by neoprene cement and placed upon a conventional blanket manufacturing machine. The top face of the second ply was coated with an adhesive. 15 parts of hollow fibers having an average diameter of 30 millimeters were thoroughly mixed with 100 parts of toluene and 100 parts of a butadiene-acrylonitrile rubber compound into which had previously been compounded small quantities of zinc oxide, carbon black, and an accelerator. The mixture was spread onto the fabric and exposed to a temperature of 100°F. to remove most of the solvent, leaving a layer about 0.010 inch thick. A third fabric ply of adhesive coated cotton duck was placed over the spread layer, and the assembly was then passed through the spreading machine and a standard surface layer, consisting primarily of acrylonitrile-butadiene rubber, was applied by repeated steps until a layer of 0.010 inch was built up. The entire assembly was cured at a temperature of 290°F. and had a thickness of 0.065 inch.

EXAMPLE II

The blanket of this example was made by the same steps and from the same materials as in the preceding example. In this example, however, the proportion of ingredients was 25 parts of fibers to 100 parts of aromatic solvent and 100 parts of butadiene-acrylonitrile rubber.

EXAMPLE III

The blanket of this example was made by the same steps and from the same materials as in Example I, except that the matrix layer was 0.015 inch thick instead of 0.010 inch thick.

It should be noted that for an elastomer having a given softness and resilience, the compressibility will be increased by increasing the total void volume per unit volume of matrix. This void volume may increase because of an increase in the amount of fibers, the diameter of the fibers, or a combination of both. The compressibility will also be increased by increasing the thickness of the intermediate layer, with a constant softness and resilience of the elastomer and constant total void volume. Various elastomers may be used and may be compounded to provide different degrees of softness and resilience, as known in the art.

The high compressibility of the blanket is caused by the fact that the hollow fibers create a closed-cell cellular structure with unconnected voids created by these fibers, these voids being highly elastic and subject to repeated compression without affecting the structural integrity of the matrix layer.

We claim:

1. A laminated printing blanket comprising at least one fabric base ply, a surface layer, and a compressible intermediate layer, said intermediate layer comprising an elastomeric matrix having unconnected voids uniformly distributed therethrough, said voids defined by discrete hollow fibers having thin elastic walls made of vinylidene chloride-acrylonitrile copolymer which is compatible with said matrix material and capable of being bonded thereto upon curing.

2. The blanket of claim 1 having a compression of 0.004 inch to 0.011 inch under a pressure of 125 p.s.i.

3. The blanket of claim 1 in which said fibers are present in the ratio of 5 to 25 parts by weight per 100 parts of elastomeric matrix material.

4. The blanket of claim 1 in which said fibers have a diameter of 0.01 to 0.1 millimeter.

5. The blanket of claim 1 in which said fibers have an average diameter of 0.03 millimeter.

6. The blanket of claim 1 in which said fibers have an average diameter of 0.03 millimeter, and are present in the ratio of 5 to 25 parts by weight per 100 parts of elastomeric matrix material.

7. A laminated printing blanket comprising at least one fabric base ply, a surface layer, and a compressible intermediate layer, said blanket having a compression of 0.004 inch to 0.011 inch under a pressure of 125 p.s.i., said intermediate layer comprising an elastomeric matrix material having a closed-cell cellular structure formed of unconnected voids uniformly distributed throughout said matrix, said voids defined by discrete hollow fibers made of vinylidene chloride-acrylonitrile copolymer having a diameter of 0.01 to 0.1 millimeter and present in said matrix in the ratio of 5 to 25 parts by weight per 100 parts of matrix material, said fibers having thin, elastic walls made of a material which is compatible with said matrix material and capable of being bonded thereto upon curing.

* * * * *